US012692798B2

(12) United States Patent
Schleif et al.

(10) Patent No.: US 12,692,798 B2
(45) Date of Patent: Jul. 28, 2026

(54) APPARATUS FOR DIVERTING RADIATION EMITTED FROM SOURCE

(71) Applicant: GE Infrastructure Technology, LLC, Greenville, SC (US)

(72) Inventors: Kurt Kramer Schleif, Greenville, SC (US); Michael Allen Ball, Greer, SC (US); Andrew David Ellis, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 326 days.

(21) Appl. No.: 18/380,058

(22) Filed: Oct. 13, 2023

(65) Prior Publication Data

US 2025/0122810 A1     Apr. 17, 2025

(51) Int. Cl.
*F01D 21/00*        (2006.01)
*G01B 15/00*        (2006.01)

(52) U.S. Cl.
CPC ........... *F01D 21/003* (2013.01); *G01B 15/00* (2013.01)

(58) Field of Classification Search
CPC ....... F01D 21/003; G01B 15/00; G01B 11/14; G01B 21/16; F05D 2260/83; F05D 2270/821; G21K 1/06; G21K 5/00; G21K 2201/06; F02C 7/32; G01S 17/08
See application file for complete search history.

(56) References Cited

U.S. PATENT DOCUMENTS

| | | | |
|---|---|---|---|
| 3,865,564 A | 2/1975 | Jaeger et al. | |
| 4,049,349 A | 9/1977 | Wemmerstrom | |
| 4,357,104 A | 11/1982 | Davinson | |
| 4,765,742 A | 8/1988 | Davinson | |
| 4,806,016 A | 2/1989 | Corpron et al. | |
| 4,850,686 A | 7/1989 | Morimoto et al. | |
| 5,557,099 A | 9/1996 | Zielinski et al. | |
| 6,473,250 B1 | 10/2002 | Chapman et al. | |

(Continued)

FOREIGN PATENT DOCUMENTS

DE     102012112644 A1     6/2014

OTHER PUBLICATIONS

European Search Report from European Patent Application No. 24201048.6 dated Feb. 6, 2025, 9 pages.

(Continued)

*Primary Examiner* — Freddie Kirkland, III
(74) *Attorney, Agent, or Firm* — Charlotte Wilson; James Pemrick; Hoffman Warnick LLC

(57)            ABSTRACT

Radiation emitted by a radiation source along a projected path can be diverted by a divergence angle by a lens in the projected path with a first surface and a second surface spaced apart along the projected path with the second surface farther from the radiation source than the first surface. The first surface can be curved and have a normal point perpendicular to a line parallel to the projected path and offset from the projected path by an eccentricity. Radiation striking the first surface can be diverted by a first angle relative to the projected path and can continue to strike the second surface, which diverts the radiation by a second angle. The sum of the first and second angles is the divergence angle. The apparatus can be used in a probe assembly to determine tip clearance of a turbine blade during operation of a gas turbine engine.

15 Claims, 8 Drawing Sheets

(56)                  References Cited

U.S. PATENT DOCUMENTS

| | | | |
|---|---|---|---|
| 7,352,512 B2 | 4/2008 | Seiden et al. | |
| 7,619,728 B2 | 11/2009 | Ogburn et al. | |
| 7,941,281 B2 | 5/2011 | Rai et al. | |
| 8,009,939 B2 | 8/2011 | Zheng et al. | |
| 8,042,412 B2 | 10/2011 | Xia et al. | |
| 8,164,761 B2 | 4/2012 | Kominsky | |
| 8,431,917 B2 | 4/2013 | Wang et al. | |
| 8,553,237 B2 | 10/2013 | Kominsky | |
| 8,654,315 B2 * | 2/2014 | Kominsky | F01D 21/003 356/5.1 |
| 9,593,941 B2 | 3/2017 | John | |
| 10,024,761 B2 | 7/2018 | Cornes et al. | |
| 10,488,182 B2 | 11/2019 | Onishi et al. | |
| 10,605,108 B2 | 3/2020 | Miyamoto et al. | |
| 10,760,897 B2 | 9/2020 | Kondou et al. | |
| 10,816,324 B2 | 10/2020 | Fukuyama et al. | |
| 11,073,378 B2 | 7/2021 | Fukuyama et al. | |
| 11,255,660 B2 | 2/2022 | Kondou et al. | |
| 12,339,113 B2 * | 6/2025 | Schleif | G02B 5/045 |
| 2004/0085526 A1 | 5/2004 | Gogolla et al. | |
| 2007/0229839 A1 | 10/2007 | Franz et al. | |
| 2010/0177299 A1 * | 7/2010 | Kominsky | F01D 11/20 356/5.01 |
| 2011/0058182 A1 | 3/2011 | Dubin et al. | |
| 2012/0182563 A1 * | 7/2012 | Kominsky | G01B 11/14 356/625 |
| 2014/0356132 A1 | 12/2014 | Leroux et al. | |
| 2016/0084637 A1 * | 3/2016 | John | F01D 11/14 250/206 |
| 2017/0268376 A1 | 9/2017 | Bailey et al. | |
| 2018/0328721 A1 | 11/2018 | Hatcher et al. | |
| 2019/0018088 A1 | 1/2019 | Hu et al. | |
| 2022/0357430 A1 | 11/2022 | Merschdorf | |
| 2024/0003678 A1 * | 1/2024 | Schleif | F01D 21/003 |
| 2024/0003679 A1 | 1/2024 | Schleif et al. | |

OTHER PUBLICATIONS

Non-Final Office Action from related U.S. Appl. No. 17/810,071 dated Sep. 20, 2024, 7 pages.
Non-Final Office Action from related U.S. Appl. No. 17/810,073 dated Apr. 10, 2024, 21 pages.
Notice of Allowance and Fees Due dated Mar. 19, 2025 for U.S. Appl. No. 17/810,071, 8 pages.
Kim, Myun-Sik, et al.; "Refraction limit of miniaturized optical systems: a ball-lens example"; Optics Express 6996; vol. 24; No. 7; Apr. 4, 2016; Copyright 2016 OSA; p. 10.

* cited by examiner

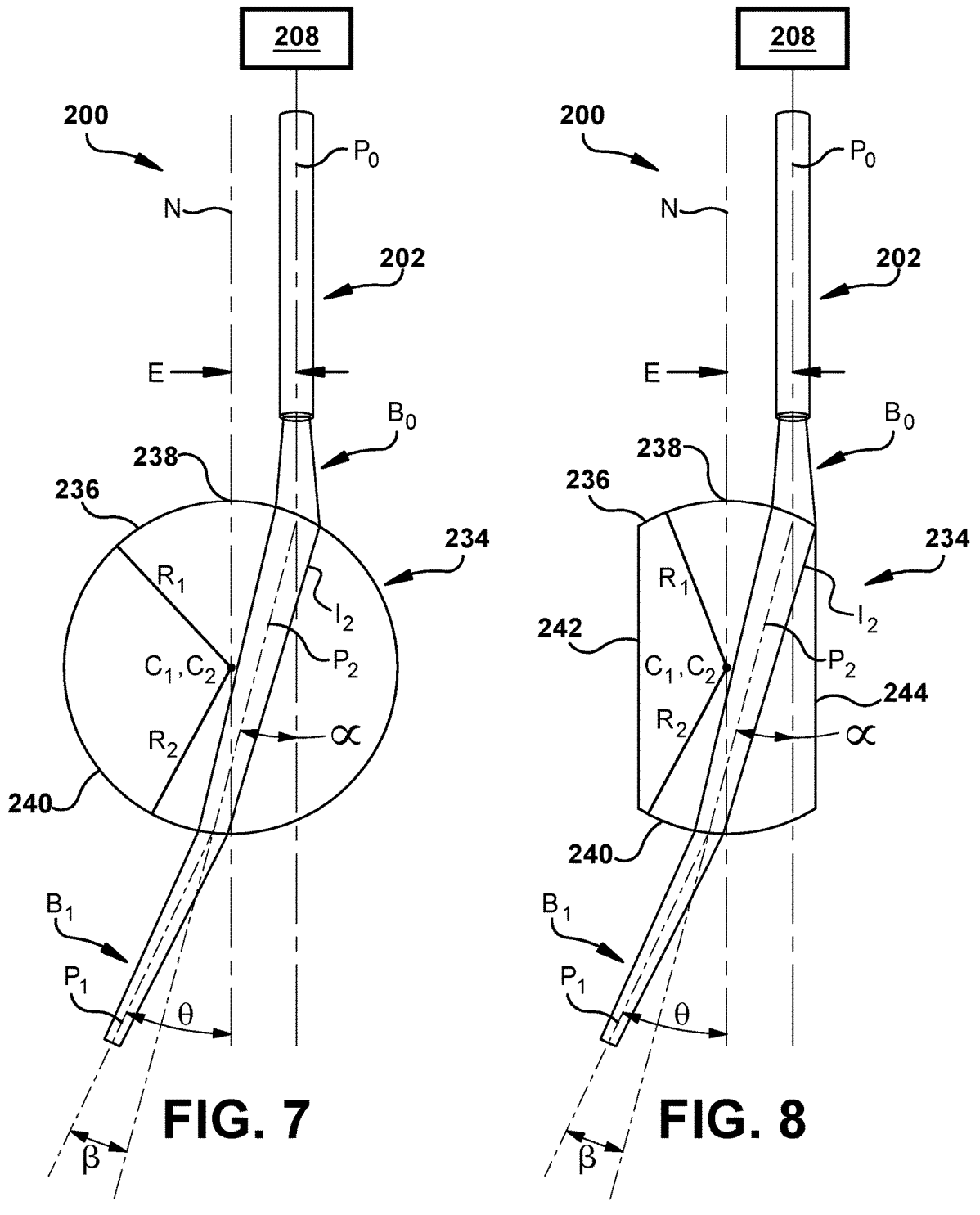
FIG. 7          FIG. 8

APPARATUS FOR DIVERTING RADIATION EMITTED FROM SOURCE

TECHNICAL FIELD

The disclosure relates generally to analysis of components and, more specifically, to an apparatus and method for diverting radiation emitted from a source from a projected path to determine distances between two components. In particular, the present apparatus and method transmit radiation to a rotating component (e.g., a rotating blade of a gas turbine) to determine its location relative to a stationary component (e.g., a casing of the gas turbine).

BACKGROUND

In the development, manufacturing, and servicing of turbomachinery, it may be desirable to measure the distance between the tip of a rotating blade, or other similarly situated component, and the inner surface of the stationary casing of the machine where the component is installed. Although such components should be kept out of contact with the casing, smaller distances between the casing and component may improve various operational aspects of the turbomachine (e.g., efficiency and performance). Measuring this distance also may be relevant to product validation, health monitoring of the turbomachine, accuracy of feedback in control systems, and/or product diagnostics.

Capacitance probes have been used in some cases to measure the distance between a component and the surrounding casing. However, some capacitance probes may be unreliable when manufactured to certain dimensions. These possible issues may be more pronounced with elevated firing temperatures, certain vibration limits, and user-defined quality constraints. A separate concern is maintaining structural integrity of the measurement assembly, e.g., maintaining probe operability in a variety of power generation modes.

Other types of probes, such as radiation-based probes, may address some of these concerns but introduce other technical challenges. In the case of radiation-based probes, the geometry of the component(s) being measured may not be compatible with the device(s) used for sending or receiving the radiation. For instance, some surface(s) may not be positioned to deflect and/or reflect radiation and/or may direct the radiation away from the component(s) for detecting the radiation.

BRIEF DESCRIPTION

All aspects, examples and features mentioned below can be combined in any technically possible way.

An aspect of the disclosure provides a probe assembly for transmitting radiation from a radiation source to a target surface of a rotating component, the probe assembly including a probe body mounted in a stationary component; a first radiation source mounted in the probe body that selectively emits radiation along a first projected path parallel to a longitudinal central axis of the probe body; and a lens mounted at an end of the probe body facing a location through which the target surface will pass, the lens having a first surface and a second surface spaced apart from the first surface, wherein the second surface is farther from the first radiation source than the first surface is, one of the first surface and the second surface including a first curved surface with a first center of curvature and a first radius of curvature, wherein the first projected path is offset by a first eccentricity from a normal line of the first curved surface that is parallel to the first projected path, whereby radiation striking the first surface is diverted by a first angle relative to the first projected path, continues through the lens to strike the second surface, and is diverted thereby by a second angle, the radiation having passed through the first curved surface, and whereby a sum of the first angle and the second angle is equal to a first divergence angle.

Another aspect of the disclosure includes any of the preceding aspects, and the first surface includes the first curved surface, and the first curved surface is spherical and concentric with the longitudinal central axis of the probe body.

Another aspect of the disclosure includes any of the preceding aspects, and the first eccentricity is determined based on an index of refraction of the lens, a frequency of the radiation emitted by the first radiation source, and the first radius of curvature.

Another aspect of the disclosure includes any of the preceding aspects, and further including a first photoreceptor mounted in the probe body and in optical communication with a first photodetector, whereby radiation diverted from the first radiation source and reflected from the target surface strikes the first photoreceptor, which conducts the reflected radiation to the first photodetector. As used herein, "photoreceptor" is used to refer to an optical component that can collect and transmit light, and "photodetector" is used to refer to an electronic device that produces a signal responsive to exposure to light.

Another aspect of the disclosure includes any of the preceding aspects, and the lens includes non-spherical surfaces extending between the first and second surfaces.

Another aspect of the disclosure includes any of the preceding aspects, and the first surface includes the first curved surface, and the second surface includes a second curved surface that has a respective second radius of curvature and a respective second center of curvature, and the second center of curvature is between the first radiation source and the second surface.

Another aspect of the disclosure includes any of the preceding aspects, and the lens is a sphere mounted concentrically with the longitudinal central axis of the probe body.

Another aspect of the disclosure includes any of the preceding aspects, and further including a second radiation source mounted in the probe body that selectively emits radiation along a second projected path parallel to the longitudinal central axis of the probe body, wherein the first radiation source and the second radiation source are mounted on opposite sides of the longitudinal central axis, the second projected path is offset from the normal line by a second eccentricity, and whereby radiation emitted by the second radiation source strikes the first surface and is diverted by a third angle relative to the second projected path, continues through the lens to strike the second surface, and is diverted thereby by a fourth angle relative to the second projected path, and whereby a sum of the third angle and the fourth angle is equal to a second divergence angle.

Another aspect of the disclosure includes any of the preceding aspects, and further comprising a first photoreceptor mounted in the probe body and in optical communication with a first photodetector such that radiation diverted from at least one of the first and second radiation sources and reflected from the target surface strikes the first photoreceptor and is conducted to the first photodetector.

Another aspect of the disclosure includes any of the preceding aspects, and radiation diverted from the first radiation source and reflected from the target surface strikes the first photoreceptor and is conducted to the first photo-detector, and further comprising a second photoreceptor mounted in the probe body and in optical communication with a second photodetector, whereby radiation diverted from the second radiation source and reflected from the target surface strikes the second photoreceptor and is conducted to the second photodetector.

Another aspect of the disclosure provides a compressor section; a combustor section; a turbine section including a plurality of rotating blades, wherein the compressor section is configured to supply compressed air to the combustor section and the combustor section is configured to combust fuel to produce hot gas that is supplied to the turbine section to rotate the plurality of rotating blades; and a probe assembly for transmitting radiation from a radiation source to a target surface of a rotating blade of the plurality of blades, the probe assembly including: a probe body mounted in a stationary component; a first radiation source mounted in the probe body that selectively emits radiation along a first projected path parallel to a longitudinal central axis of the probe body; and a lens mounted at an end of the probe body facing a location through which the target surface will pass, the lens having a first surface and a second surface spaced apart from the first surface, wherein the second surface is farther from the first radiation source than the first surface is, one of the first surface and the second surface including a first curved surface with a first center of curvature and a first radius of curvature, wherein the first projected path is offset by a first eccentricity from a normal line of the first curved surface that is parallel to the first projected path, whereby radiation striking the first surface is diverted by a first angle relative to the first projected path, continues through the lens to strike the second surface, and is diverted thereby by a second angle, the radiation having passed through the first curved surface, and whereby a sum of the first angle and the second angle is equal to a first divergence angle.

Another aspect of the disclosure includes any of the preceding aspects, and the first surface includes the first curved surface, and the first curved surface is spherical and concentric with the longitudinal central axis of the probe body.

Another aspect of the disclosure includes any of the preceding aspects, and further including a first photoreceptor mounted in the probe body and in optical communication with a first photodetector, whereby radiation diverted from the first radiation source and reflected from the target surface strikes the first photoreceptor, which conducts the reflected radiation to the first photodetector.

Another aspect of the disclosure includes any of the preceding aspects, and the first surface includes the first curved surface, and the second surface includes a second curved surface that has a respective second radius of curvature and a respective second center of curvature, and the second center of curvature is between the first radiation source and the second surface.

Another aspect of the disclosure includes any of the preceding aspects, and further including a second radiation source mounted in the probe body that selectively emits radiation along a second projected path parallel to the longitudinal central axis of the probe body, wherein the first radiation source and the second radiation source are mounted on opposite sides of the longitudinal central axis, the second projected path is offset from the normal line by a second eccentricity, and whereby radiation emitted by the second radiation source strikes the first surface and is diverted by a third angle relative to the second projected path, continues through the lens to strike the second surface, and is diverted thereby by a fourth angle relative to the second projected path, and whereby a sum of the third angle and the fourth angle is equal to a second divergence angle.

Another aspect of the disclosure includes any of the preceding aspects, and radiation diverted from the first radiation source and reflected from the target surface strikes the first photoreceptor and is conducted to the first photo-detector, and further comprising a second photoreceptor mounted in the probe body and in optical communication with a second photodetector, whereby radiation diverted from the second radiation source and reflected from the target surface strikes the second photoreceptor and is conducted to the second photodetector.

Another aspect of the disclosure includes any of the preceding aspects, and at least one of the first eccentricity and the second eccentricity is determined based on an index of refraction of the lens, a respective frequency of the radiation emitted by the at least one of the first radiation source and the second radiation source, and at least one of the first radius of curvature and the second radius of curvature.

A further aspect of the disclosure provides a method of determining clearance of a rotating component in a gas turbine engine, the gas turbine engine including a turbine section supplied hot gas from a combustor section that is supplied compressed air from a compressor section, the method comprising: mounting a probe body of a probe assembly in a stationary component of the gas turbine engine; mounting a first radiation source in the probe body that selectively emits radiation along a first projected path parallel to a longitudinal central axis of the probe body; mounting a lens at an end of the probe body and facing a location through which the target surface will pass, the lens having a first surface and a second surface spaced apart from the first surface, wherein the second surface is farther from the first radiation source than the first surface, one of the first surface and the second surface including a first curved surface with a first center of curvature and a first radius of curvature, wherein the first projected path is offset by a first eccentricity from a normal line of the first curved surface that is parallel to the first projected path, whereby radiation striking the first surface is diverted by a first angle relative to the first projected path, continues through the lens to strike the second surface, and is diverted thereby by a second angle, the radiation having passed through the first curved surface, and whereby a sum of the first angle and the second angle is equal to a first divergence angle; mounting a first photoreceptor in the probe body in optical communication with a first photodetector; detecting with the first photodetector radiation from the first radiation source that is reflected from the target surface at a first location of the target surface; and determining a clearance of the rotating component using the detection of the reflected radiation from the first radiation source.

Another aspect of the disclosure includes any of the preceding aspects, and further comprises mounting a second radiation source in the probe body that selectively emits radiation along a second projected path parallel to the longitudinal central axis of the probe body, wherein the second projected path is offset by a second eccentricity from the normal line of the first curved surface that is parallel to the second projected path, whereby radiation striking the first surface is diverted by a third angle relative to the second projected path, continues through the lens to strike the second surface, and is diverted thereby by a fourth angle, the radiation having passed through the first curved surface, and whereby a sum of the third angle and the fourth angle is equal to a second divergence angle; mounting a second photoreceptor in the probe body in optical communication with a second photodetector; detecting with the second photodetector radiation from the second radiation source that is reflected from the target surface at a second location of the target surface; and wherein determining the clearance of the rotating component includes using the detection of the reflected radiation from the second radiation source.

Another aspect of the disclosure includes any of the preceding aspects, and determining the clearance includes using a time of arrival technique.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 7-10 show schematic cross-sectional views of radiation diverting apparatus according to embodiments of the disclosure;

Figure 1:
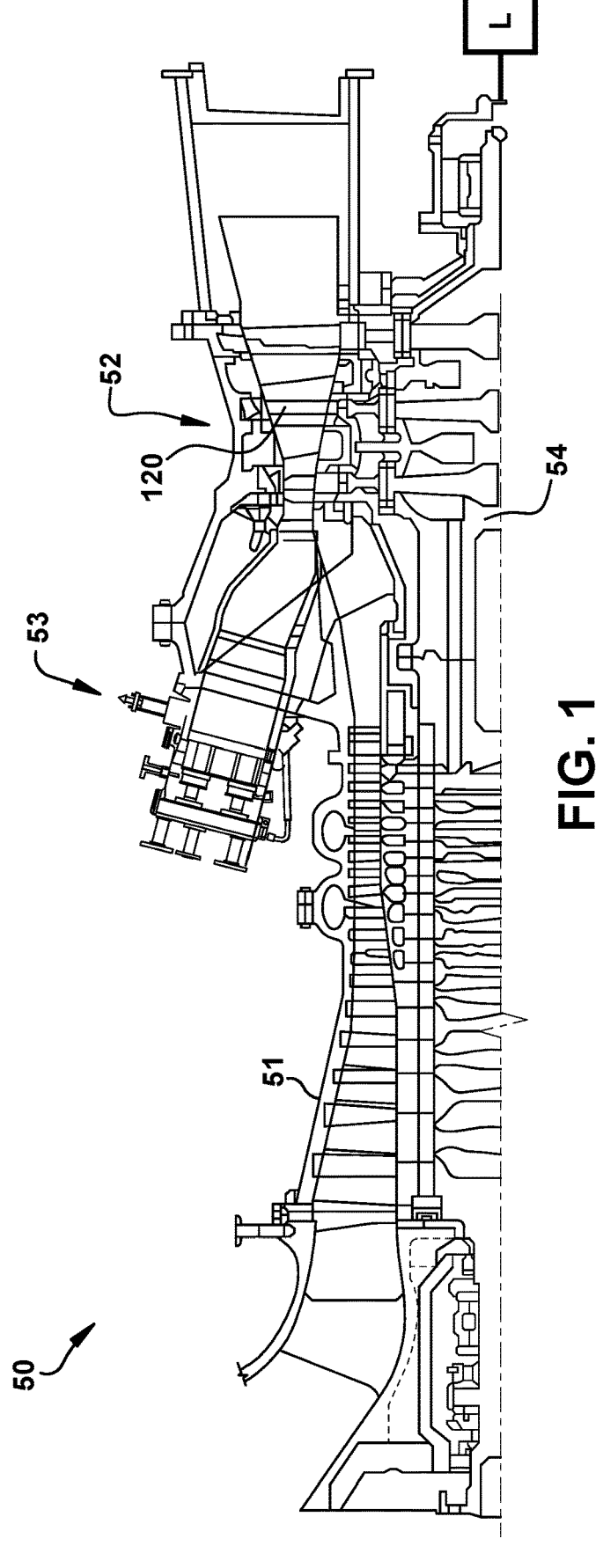
FIG. 1 shows a cross-sectional side view of a gas turbine engine in which embodiments of the disclosure can be employed.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a method and apparatus for diverting light from a source, such as to direct light emitted from the end of an optical fiber in a sensor arrangement for a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" or "fore" referring to the front or compressor end of the turbomachine, and "aftward" or "aft" referring to the rearward or turbine end of the turbomachine.

It is often required to describe parts that are at differing radial positions with regard to a center axis. The term "axial" refers to movement or position parallel to an axis, e.g., an axis of a turbomachine. The term "radial" refers to movement or position perpendicular to an axis, e.g., an axis of a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential interior surface of a casing extending about an axis of a turbomachine. As indicated above, it will be appreciated that such terms may be applied in relation to the axis of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur or that the subsequently described component or element may or may not be present and that the description includes instances where the event occurs or the component is present and instances where the event does not occur or the component is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, no intervening elements or layers are present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As noted above, "photoreceptor" is used herein to refer to an optical component that can collect and transmit light, and "photodetector" is used to refer to an electronic device that produces a signal responsive to exposure to light.

As seen in FIG. 1, a gas turbine engine 50 can include a compressor section 51 and a turbine section 52. Compressed air from compressor section 51 is supplied to a combustor section 53 where fuel is combusted to produce hot gas that is supplied to turbine section 52. Turbine section 52 includes rotating blades 120 that convert axial flow of the hot gas into rotational motion, which is used to drive compressor section 53 and a load L via a shaft 54.

Figure 2:
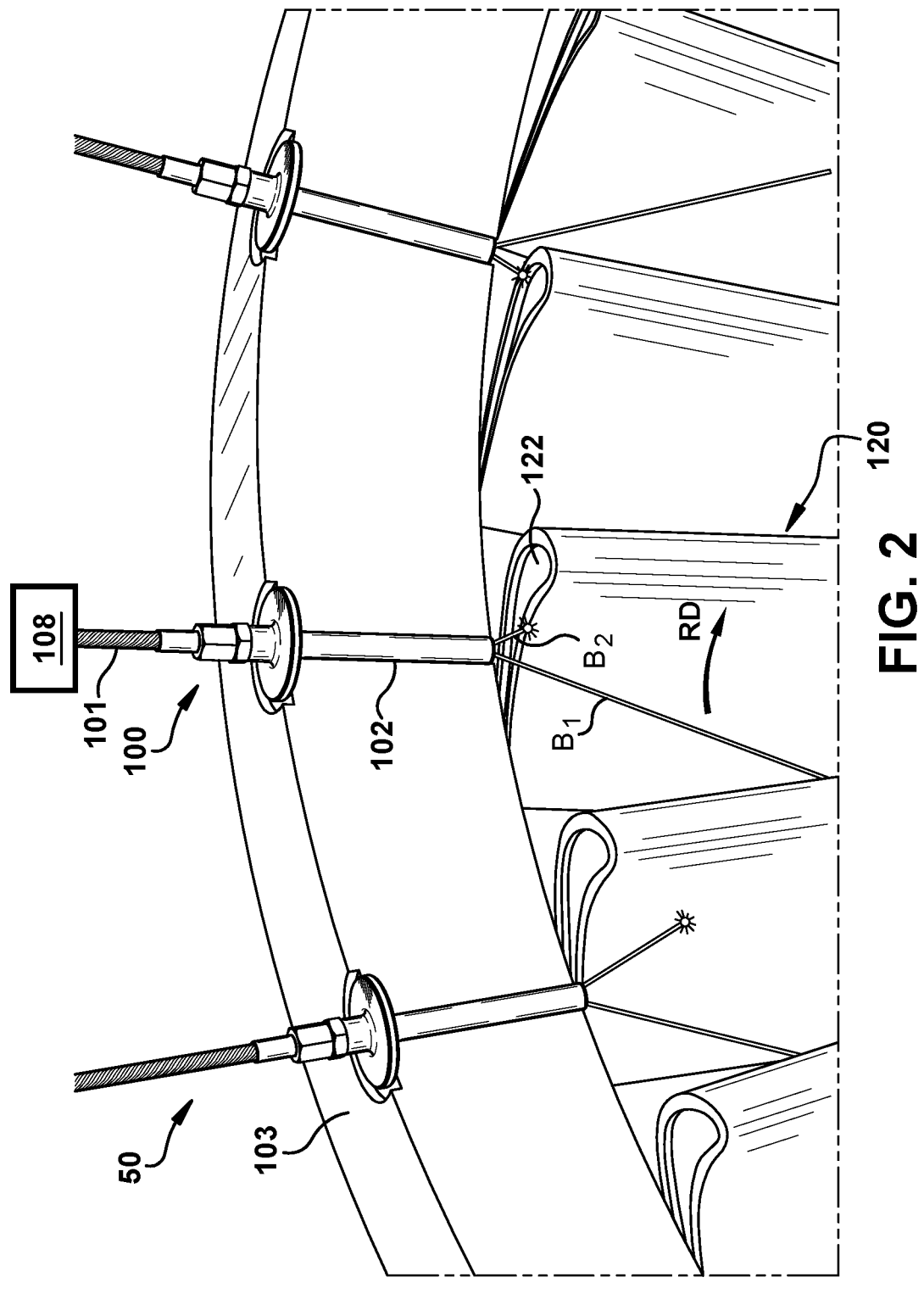
FIG. 2 shows an isometric elevational view of a stationary component of a turbine of a gas turbine engine, such as that shown in FIG. 1, showing tip clearance probes with which embodiments of the disclosure can be employed and arranged to determine clearance of tips of rotating blades of the turbine of the gas turbine engine.
Figure 3:
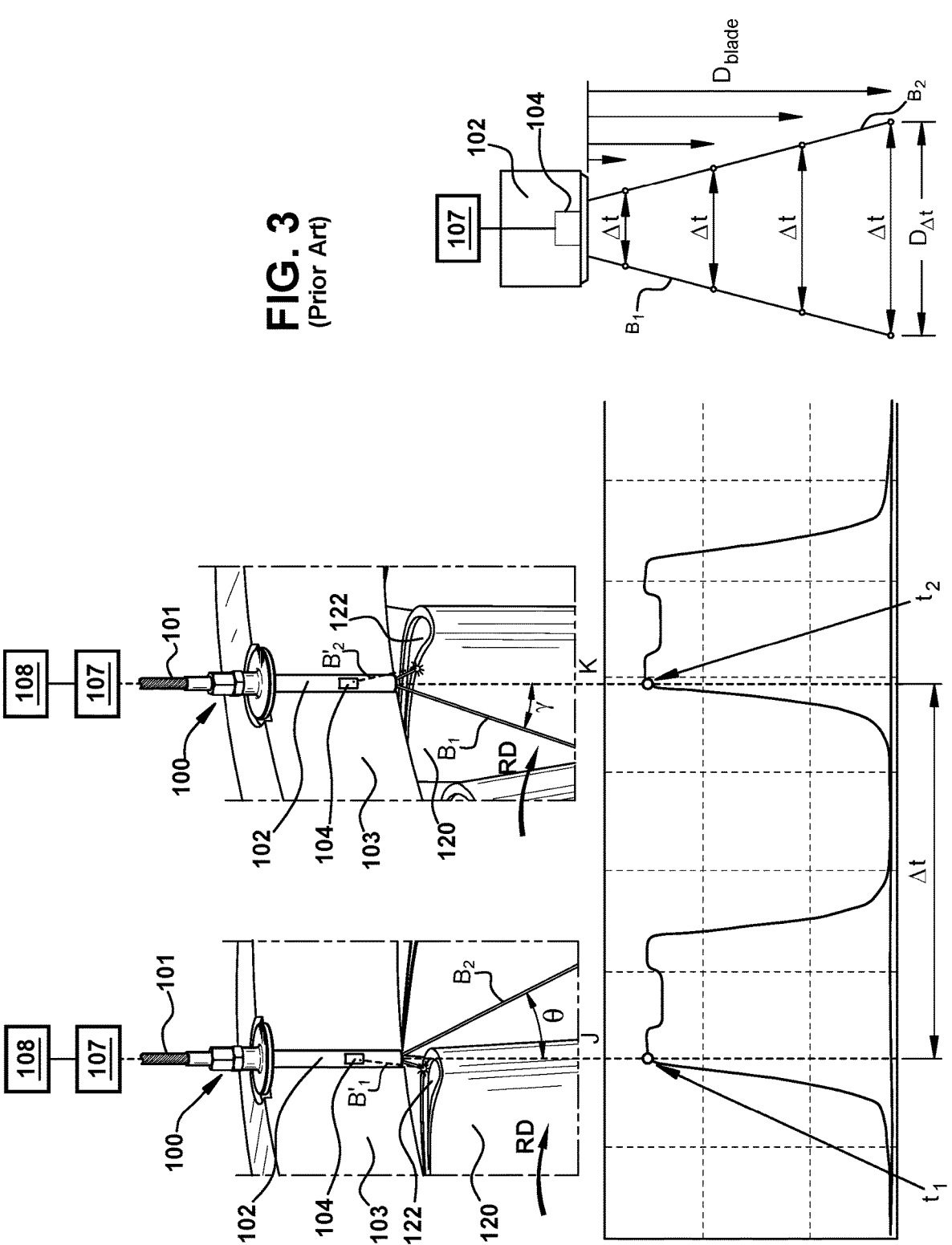
FIG. 3 schematically illustrates a prior art "time of arrival" tip clearance determination technique that can be used according to embodiments of the disclosure.

Particularly in turbine section 52, with additional reference to FIG. 2, a clearance between a tip 122 of blade 120 and a stationary component 103 of gas turbine engine 50 is monitored. To that end, as illustrated in FIG. 2, a probe 100 can be mounted in stationary component 103 that emits first and second radiation beams $B_1$, $B_2$ from a body 102. Body 102 can be regarded as a radiation source, and in embodiments can include a radiation emitter, such as a laser. In other embodiments, a radiation source 108 can be connected to body 102 via an optical conductor 101, such as a fiber optic cable. Radiation source 108 can include one or more lasers, such as one or more light emitting diode (LED) lasers, but can include other suitable radiation emitters. As seen schematically in FIG. 3, embodiments can employ the "time of arrival" technique to determine a clearance distance $D_{blade}$ between stationary component 103 and tip 122 of blade 120. This technique is typically used by calibration rigs, where the blade tip moves at very slow velocity compared to an actual blade during operation of an engine. First and second radiation beams $B_1$ and $B_2$ exit body 102 at known angles θ, γ. As blade 120 rotates in direction of rotation RD, it will pass first through beam $B_1$ then through beam $B_2$, yielding reflected radiation $B'_1$, $B'_2$ (dashed lines). In embodiments, reflected radiation $B'_1$, $B'_2$ can be produced by tip 122 of blade 120 passing through first and second radiation beams $B_1$ and $B_2$, though any portion of blade 120 struck by either of beams $B_1$ and $B_2$ can reflect radiation. Note that reflected radiation $B'_1$, $B'_2$ may not be in the form of beams per se, or may be very divergent beams. One or more photoreceptors 104 can be placed in or around body 102 and in optical communication with respective photodetectors 107 to detect reflected radiation $B'_1$, $B'_2$. An example of a photoreceptor 104 as used herein can include an optical fiber that conducts received radiation to a respective photodetector 107 so that photodetector 107 can be mounted a safe distance from the environment at the end of body 102, such as the hot gas path of a gas turbine engine. As seen in the graph at the bottom of FIG. 3, photodetector 107 signal strength increases as blade 120 enters each beam, levels off, and then decreases as blade 120 leaves each beam. An initial maximum or near maximum signal strength value can be used to signify arrival of blade 120 at each beam $B_1$, $B_2$. An elapsed time Δt between arrivals can be determined, which, as suggested in FIG. 3, varies directly with a distance $D_{Δt}$ between the physical locations of the blade tip at the times of arrival. The distance $D_{Δt}$ itself varies with clearance distance $D_{blade}$ of tip 122 of blade 120 from the end of body 102, as well as stationary component 103, and varies with parameters such as Δt, the engine speed, and the radius of the blade tip. Thus, a threshold distance $D_{Δt}$ can be used to indicate when clearance has become too small. The elapsed time Δt can therefore be used as a measure of a clearance distance $D_{blade}$ between tip 122 and stationary component 103. For example, a controller can include a stored look-up table or the like of elapsed time Δt between arrivals vs. distance $D_{Δt}$ between blade tip location at the times of arrival, can determine an elapsed time Δt between arrivals using the signal of photodetector 107, and can provide a clearance value $D_{blade}$ for the determined elapsed time Δt. In other words, the Δt between the two time-of-arrivals is proportional to the clearance distance $D_{blade}$, as determined through calibration.

It should be noted that the same type of probe can use a diverging laser light for other measurements. For example, such a probe can be used to acquire a measurement at a location on the blade other than the tip, such as at a percentage of blade span, typically 90%, which could be used to measure vibration of the blade. The beam from the probe in such an application is directed at the leading edge or trailing edge of the blade at the percentage of the span, here 90% of the distance from base to tip. The probe in this case can be positioned axially forward or aft of the blade tip so that the probe can emit laser light at an angle that is focused on the side (edge) of the blade. This technique is occasionally performed for blade tip timing or aeromechanics vibration measurement.

Figures 4, 5, 6:
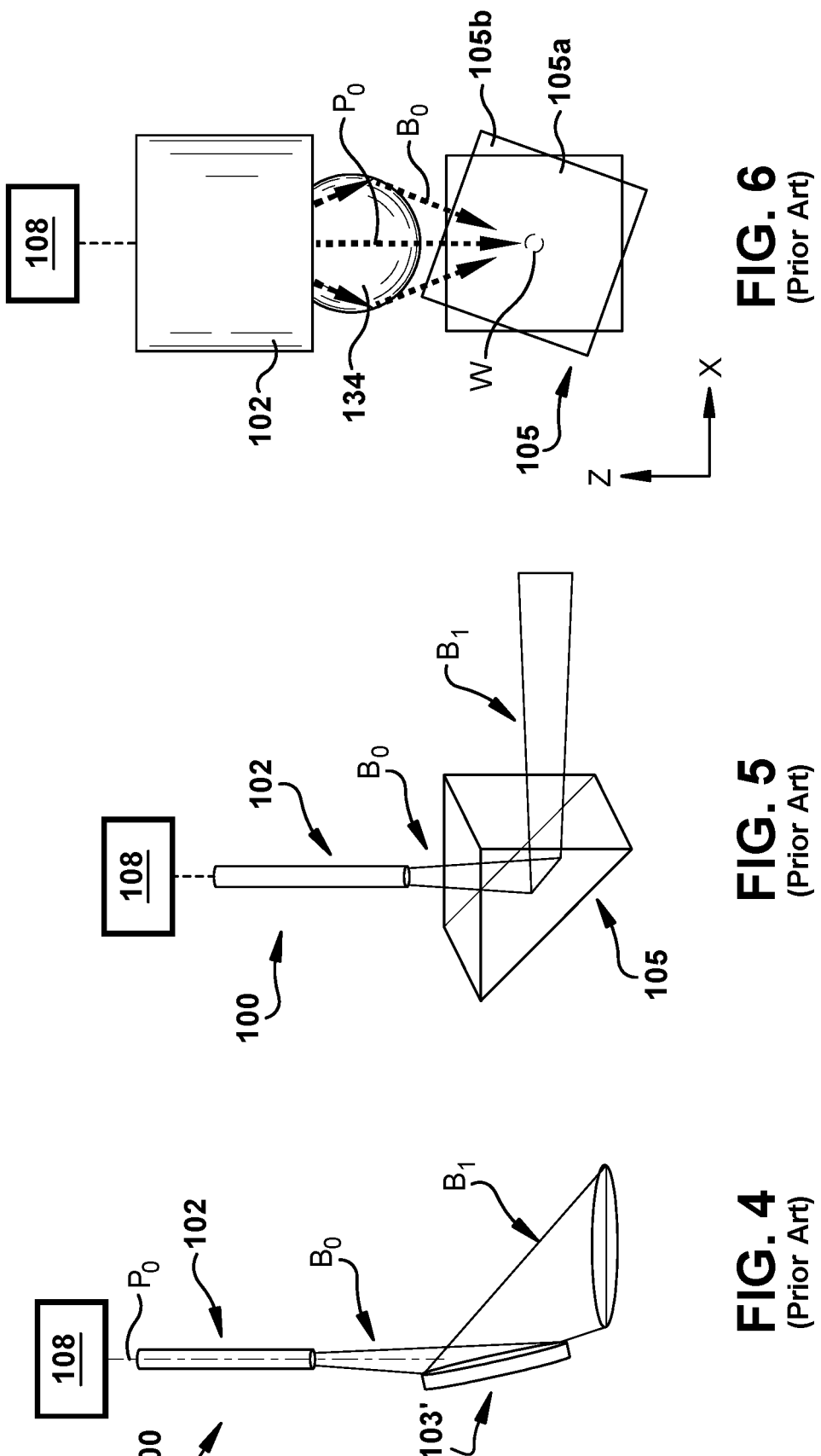
FIGS. 4-6 show prior art arrangements for diverting radiation upon which embodiments of the disclosure improve.

Several approaches have been taken to cause radiation beams $B_1$, $B_2$, also referred to as diverted beams, to exit probe 100 at their respective angles. For example, as seen in FIG. 4, a mirror 103' can be placed in the path of an initial beam $B_0$ to divert it from its path $P_0$. However, as a result of refraction and reflection of the mirror, initial beam $B_0$ becomes increasingly divergent and attenuated when it is reflected into diverted beam $B_1$, resulting in weakened reflections from blades when used in a probe, such as that described above. Replacing mirror 103' with a prism 105 as seen in FIG. 5 results in similar increases in divergence as between initial beam $B_0$ and diverted beam $B_1$, again resulting in weaker reflected radiation due to refraction and reflection of initial beam $B_0$ through prism 105. A more recent approach, seen in FIG. 6, adds a lens 134 to focus initial beam $B_0$ onto a focal point W that coincides with a center of prism 105. In a first position 105a, prism 105 does not divert initial beam $B_0$, but by rotating prism 105 to a second position 105b, initial beam $B_0$ can be diverted. While the arrangement of FIG. 6 still diverges initial beam $B_0$, the divergence is reduced by lens 134, and reflections of the diverted beam $B_1$ can be stronger than results from the examples of FIGS. 4 and 5.

The example illustrated in FIG. 6 takes advantage of well-known principles of optics and lenses, particularly the refraction of light as it crosses from one medium to another when the media have different indices of refraction. For example, when a ray of light traveling through air strikes a pane of glass, the ray will bend toward a normal line perpendicular to the surface of the glass at the location where the ray strikes according to Snell's law, which states that:

$$n_i \sin\theta_i = n_R \sin\theta_R, \text{ or} \tag{1}$$

$$\theta_R = \sin^{-1}\left(\frac{n_i}{n_R}\sin\theta_i\right),$$

where $n_i$ is the index of refraction of air, $\theta_i$ is the angle the ray forms with the normal line, $n_R$ is the index of refraction of the glass, and $\theta_R$ is the angle the bent ray forms with the normal line. The index of refraction of air is 1, and for typical glass is about 1.5, though glass with other indices of refraction is available in many forms. If the ray strikes the pane of glass perpendicular to the surface, then the ray is not bent or diverted. However, if the ray strikes the pane at a non-normal angle, then the ray can be said to bend by an angle ω according to:

$$\omega = \theta_i - \theta_R = \theta_i - \sin^{-1}\left(\frac{n_i}{n_R}\sin\theta_i\right). \tag{2}$$

As is known, the index of refraction n of a material typically varies with the wavelength of radiation being refracted, which is why prisms create rainbows in sunlight. Thus, for accuracy, a material's index of refraction for a particular wavelength or frequency of radiation being refracted can be used. Snell's law is true regardless of the shape of a surface and can therefore be applied to lenses and other optical elements.

FIGS. 7-10 show examples of a radiation diverting apparatus 200 according to embodiments of the disclosure that take advantage of the refractive properties of lenses to reduce even further an amount of divergence experienced by the initial beam. A radiation source 208 of apparatus 200 can selectively emit radiation, such as in an initial beam $B_0$, along a projected path $P_0$, through a body 202 by which apparatus 200 can divert initial beam $B_0$ by a divergence angle θ. For example, apparatus 200 can include a lens 234 that has a first surface 236 and a second surface 240 spaced apart along projected path $P_0$ such that second surface 240 is farther from radiation source 208 than first surface 236. In embodiments, first surface 236 (proximal to radiation source 208) can include a first curved surface with a first center of curvature $C_1$ and a first radius of curvature $R_1$. First surface 236 can have a normal point 238 where first surface 236 is perpendicular ("normal" or at an angle of 90°) to a normal line N that is parallel to projected path $P_0$. If projected path $P_0$ intersected normal point 238, initial beam $B_0$ would pass through first surface 236 without a change in direction.

However, embodiments of the disclosure offset normal point 238 from projected path $P_0$ by an eccentricity E, which is a distance between normal line N and projected path $P_0$. Radiation from radiation source 208, such as initial beam $B_0$, strikes first surface 236 at a location that is at a non-normal angle relative to projected path $P_0$. As a result, refraction occurs such that initial beam $B_0$ striking first surface 236 can be diverted by a first angle α relative to normal line N and projected path $P_0$, such as into an intermediate beam $I_2$ following intermediate path $P_2$. First angle α can be determined using Equation (2) above, assuming indices of refraction of air and lens material are 1 and 1.5, respectively, so that:

$$\alpha = \theta_0 - \sin^{-1}\left(\frac{\sin\theta_0}{1.5}\right). \tag{3}$$

The diverted radiation in intermediate beam $I_2$ can continue to second surface 240 (distal to radiation source 208), which refracts intermediate beam $I_2$ when it strikes second surface 240 at a non-normal angle relative to a local normal line for the location on second surface 240. Thus, assuming the same values for the indices of refraction of air and lens material as in Equation (3) and an angle of incidence $\theta_1$ with the local normal line, intermediate beam $I_2$ will be refracted by an angle $\theta_2$ determined according to:

$$\theta_2 = \sin^{-1}\left(\frac{\sin\theta_1}{1.5}\right), \tag{4}$$

and intermediate beam $I_2$ can be said to be diverted by a second angle β into diverted beam $B_1$ following diverted path $P_1$, according to:

$$\beta = \theta_1 - \sin^{-1}\left(\frac{\sin\theta_1}{1.5}\right). \tag{5}$$

Figure 12:
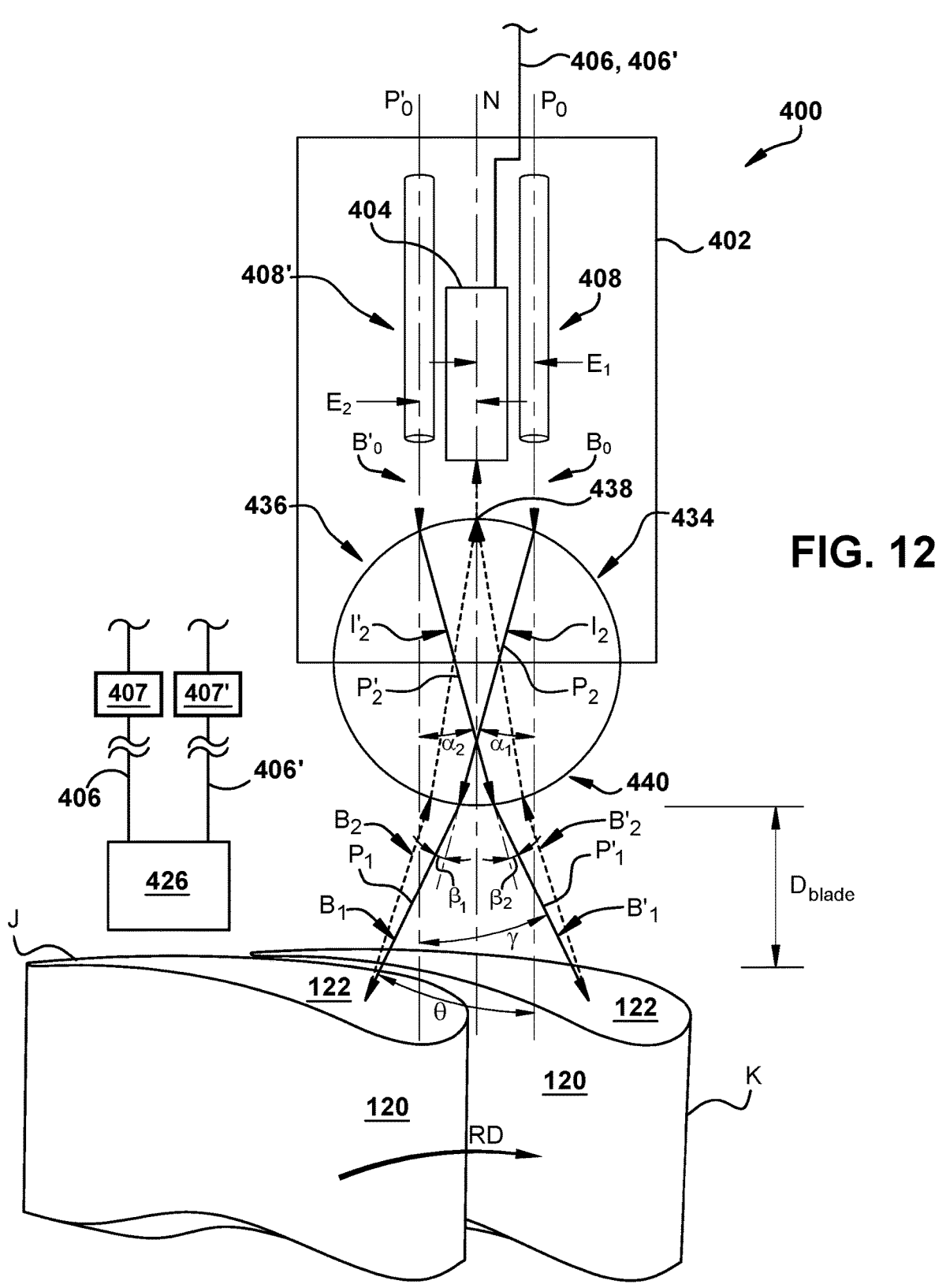
FIG. 12 shows a schematic view of a probe assembly according to other embodiments of the disclosure in which a single photodetector can be employed.

A sum of first angle α and second angle β is equal to divergence angle θ. It should be noted that the angles shown for beams $B_0$, $B_1$, $I_2$, and $B_2$ (the latter of which is shown in FIG. 12) are illustrative only and should not be interpreted as the actual angles by which the beams are diverted. Radiation striking either first surface 236 or second surface 240 at an angle of 90° will not be refracted.

Figure 11:
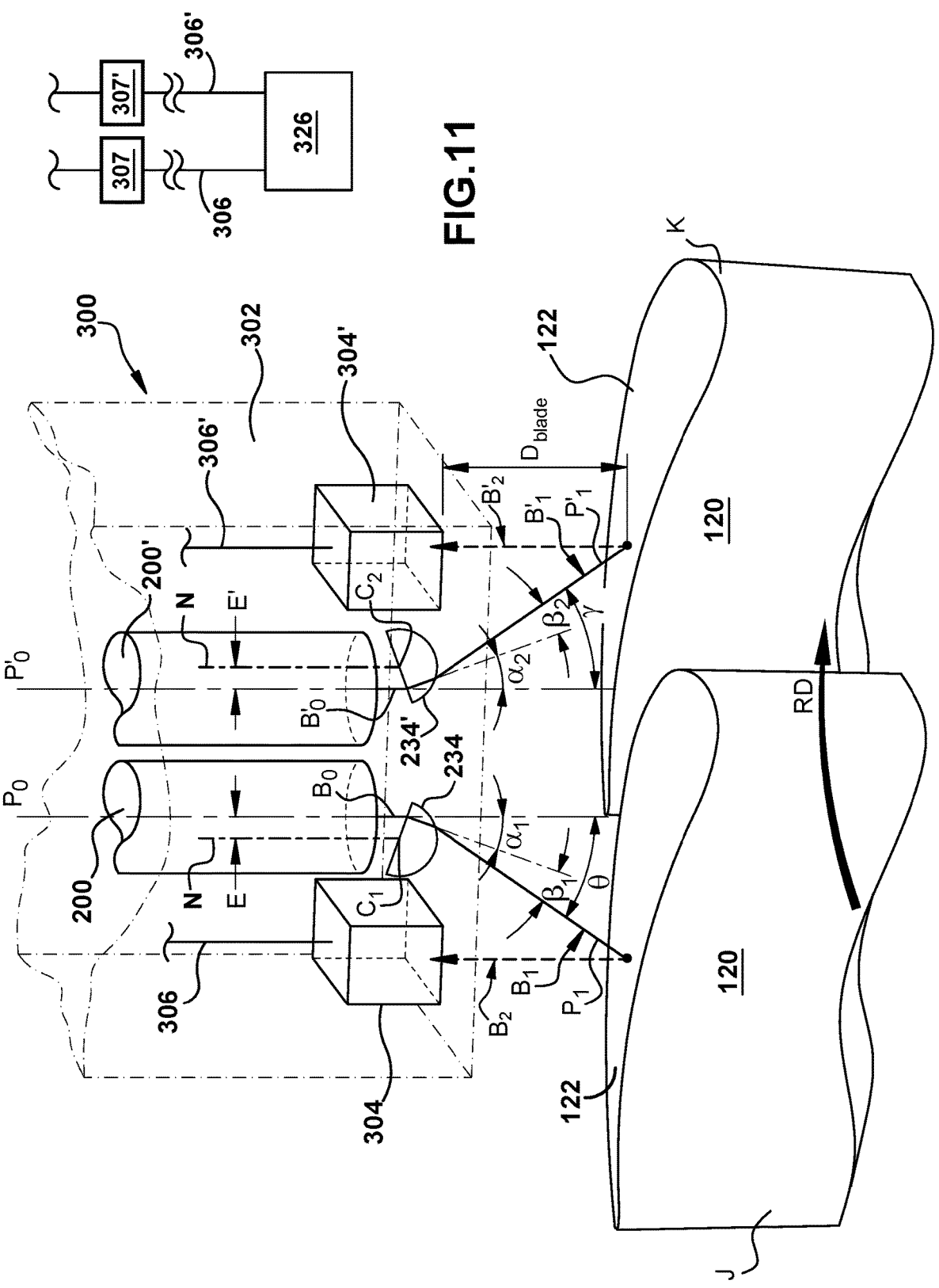
FIG. 11 shows a schematic isometric view of a probe assembly according to embodiments of the disclosure including transparency of some components to allow enhanced viewing of the assembly.

In embodiments, eccentricity E can be determined based on an index of refraction of lens 234, a frequency of radiation emitted by radiation source 208, and first radius of curvature $R_1$ of first surface 236. First and second angles α, β can be determined using the variant of Snell's law in Equation (2) above and the curvature of first and second surfaces 236, 240, if any. Alternatively, particularly for lenses and systems more complicated than the examples of FIGS. 7-11, it can be advantageous to instead determine eccentricity E by calibration after making an estimate, such as by using optics simulation software. First surface 236 can be spherical, as shown in FIG. 7, but can have other curvatures, such as parabolic, hyperbolic, or other type of curvature as may be suitable and/or desired. First surface 236 can instead be planar if so desired and/or appropriate, as shown in FIG. 11.

Figures 9, 10:
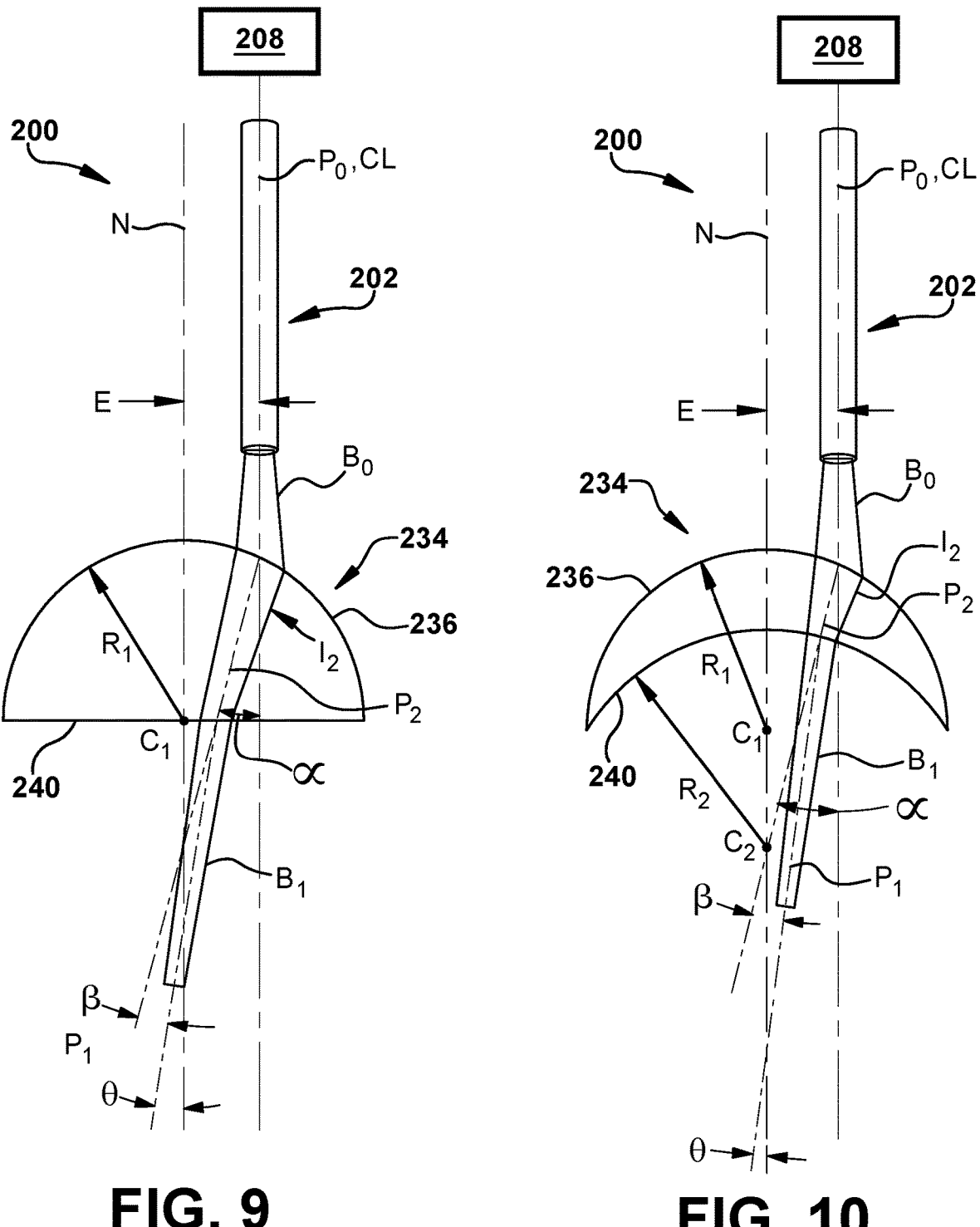

In addition, second surface 240 in embodiments can include a second curved surface, which can have a respective second center of curvature $C_2$ and respective second radius of curvature $R_2$. In embodiments, second center of curvature $R_2$ can be between second surface 240 and radiation source 208, such as is seen in FIGS. 7 and 8, while in other embodiments, second surface 240 can be between radiation source 208 and second center of curvature $C_2$, as seen in FIG. 10. In still other embodiments, second surface 240 can be planar, as illustrated in FIG. 9. Alternately, as shown in FIG. 11, first surface 236 can be planar, and second surface 240 can have a curved surface.

Further, as illustrated in FIG. 8, it can be advantageous in some embodiments to have linear surfaces 242, 244 extending between first surface 236 and second surface 240, such as to reduce a size of lens 234 overall and/or to simplify mounting of lens 234. In the example of FIG. 8, linear surfaces 242, 244 can be the outer surface of a right circular cylinder formed between first and second surfaces 236, 240 seen in cross section. In other embodiments, linear surfaces 242, 244 can be flat as though a spherical lens were cut to form planar sides of lens 234. As with first surface 236, second surface 240 can be spherical, or it can instead have parabolic, hyperbolic, or any other type of curvature as may be suitable and/or desired. In some embodiments, lens 234 can be a ball lens such that first and second surfaces 236, 240 are substantially identical with concentric centers of curvature and equal radii of curvature $R_1$, $R_2$, such as shown in FIG. 7.

In embodiments such as that in FIG. 8, first and second surfaces 236, 240 can be substantially identical with equal radii of curvature $R_1$, $R_2$, but a distance between first and second surfaces 236, 240 could be smaller or greater than twice either radius of curvature. That is, first and second surfaces 236, 240 could be closer together or farther apart than they would be as part of a ball lens, but still have identical curved surfaces. It should further be noted that in such embodiments, first and second surfaces 236, 240 need not be identical and could have different radii of curvature $R_1$, $R_2$ as in the example of FIG. 10, or even different types of curvature as suitable and/or desired.

Embodiments of the disclosure can be used together in a probe assembly 300, shown schematically in FIG. 11, which can employ the time of arrival measurement technique discussed above with reference to FIG. 3. For example, first apparatus 200 and second apparatus 200' can be arranged parallel to each other within assembly body 302. In embodiments, first and second apparatus 200, 200' can be substantially identical as described above, but mounted to mirror each other such that they divert respective initial beams $B_0$, $B'_0$ in opposite directions from initial paths $P_0$, $P'_0$ by equal first and second divergence angles $\theta$, $\gamma$ to produce diverted beams $B_1$, $B'_1$. As seen in FIG. 11, probe assembly 300 can further include photoreceptors 304, 304' mounted in optical communication with and configured to conduct reflected radiation $B_2$, $B'_2$ to respective photodetectors 307, 307'. Photodetectors 307, 307' can thereby detect radiation $B_2$, $B'_2$ reflected from a target surface, such as a surface of tip 122 of blade 120 as it moves from position J to position K in rotation direction RD, and conducted to them by photoreceptors 304, 304'. Responsive to detection of reflected radiation $B_2$, $B'_2$, photodetectors 307, 307' can send a respective electrical signal along lines 306, 306' to controller 326.

Controller 326 can use a first maximum or near maximum value of each signal on lines 306, 306' to signify a respective arrival time of tip 122 of blade 120 at each beam $B_1$, $B'_1$. Controller 326 can then use the elapsed time $\Delta t$ between arrivals of reflected beams $B_2$, $B'_2$ to determine tip clearance $D_{blade}$, such as by using a look-up table. It should be noted that first and second apparatus 200, 200' need not be identical and that first and second divergence angles $\theta$, $\gamma$ need not be equal where suitable and/or desired. In addition, while FIG. 11 shows the use of two lenses 234, 234', the same beam divergence could instead be achieved with a single lens, such as one similar to that shown in FIG. 10, with appropriate scaling and rotation thereof. In addition, while the examples of FIGS. 7-10 show each lens with its center line parallel to the projected beam path $B_0$, one or more of lenses 234 could be rotated relative to the projected beam path $B_0$ as seen in FIG. 11.

An alternative probe assembly 400 is shown in FIG. 12 in which a probe body 402 can be mounted in a stationary component (e.g., a casing, shown as 103 in FIG. 2) and can include a lens 434 mounted in an end of probe body 402 facing a location through which a target surface, such as a surface of tip 122 of blade 120, will pass. Lens 434 can include a first surface 436 with a first center of curvature $C_1$ and a first radius of curvature $R_1$ and can also include a second surface 440 farther from the end of the probe than first surface 436. The second surface 440 may have a second radius of curvature $R_2$ equal to first radius of curvature $R_1$ (as shown in FIGS. 7 and 8) or different from first radius of curvature $R_1$ (as shown in FIG. 10).

A first radiation source 408 mounted proximate to or within the probe body 402 can selectively emit radiation, such as a first initial beam $B_0$, along a first projected path $P_0$ parallel to a longitudinal central axis of the probe body 402, here shown as colinear with and illustrated by a normal line N passing through a normal point 438 of lens 434 with which normal line N is perpendicular. First projected path $P_0$ can be parallel to normal line N and can be offset from normal line N by a first eccentricity $E_1$, whereby radiation striking first surface 436 can be diverted by a first angle $\alpha_1$ relative to first projected path $P_0$, which can be determined using Equation (3), above. Diverted radiation from first initial beam $B_0$ can continue along intermediate path $P_2$ through lens 434 as intermediate beam $I_2$ to strike second surface 440 and can be diverted thereby by a second angle $\beta_1$, which can be determined using Equation (5) above. A sum of first angle $\alpha_1$ and second angle $\beta_1$ is equal to first divergence angle $\theta$. Beam $B_1$ travels from second surface 440 of lens 434 to target surface 122 (e.g., tip) of blade 120 and is reflected from target surface 122 as reflected beam $B_2$, which projects to photoreceptor 404.

In embodiments of the disclosure, first surface 436 can be spherical and concentric with first surface's center of curvature $C_1$ on normal line N, which is also the longitudinal central axis of probe assembly 400. In addition, as in other embodiments described above, first eccentricity $E_1$ can be determined based on calibration and/or trial and error. Alternatively, first eccentricity $E_1$ can be determined using Equation (6) above and an index of refraction of lens 434, a frequency of radiation emitted by first radiation source 408, and the radius of curvature $R_1$ of first surface 436 (e.g., as shown in FIGS. 7-10).

Probe assembly 400 can employ a time of arrival measurement technique as discussed above with reference to FIG. 3. To that end, as illustrated in FIG. 12, a first photoreceptor 404 can be mounted in probe body 402 and in optical communication with a first photodetector 407 such that radiation $B_1$ diverted from first radiation source 408 and reflected as beam $B_2$ from the target surface, such as a surface of tip 122 of blade 120, can strike first photoreceptor 404 and be conducted to first photodetector 407.

Second surface 440 can have a respective second radius of curvature $R_2$ and a respective center of curvature $C_2$, which may or may not be the same as the first radius of curvature $R_1$ and respective center of curvature $C_1$. In embodiments, second center of curvature $C_2$ can be between the probe body 402 and second surface 440, and second surface 440 can be farther from the end of probe body 402 than first surface 436. For example, lens 434 can be a sphere or ball lens mounted with its center on the longitudinal central axis N of probe body 402, which is also the normal line N of lens 434 with regard to projected path $P_0$ of first initial beam $B_0$. To make probe assembly 400 more compact and/or to ease mounting considerations, lens 434 can include non-spherical surfaces extending between first and second curved surfaces 436, 440 as with the example illustrated in FIG. 8 and described above.

In some embodiments, a second radiation source 408' can also be mounted in probe body 402 that can selectively emit radiation, such as second initial beam $B'_0$, along a second projected path $P'_0$ parallel to normal line N, which is coincident with the longitudinal central axis of probe body 402. Within probe assembly 400, first radiation source 408 and second radiation source 408' can be mounted on opposite sides of normal line N, and second projected path $P'_0$ can be offset from normal line N by a second eccentricity $E_2$. As with first eccentricity $E_1$, second eccentricity $E_2$ can be determined by calibration and/or trial and error, or it can be based on an index of refraction of lens 434, a respective frequency of radiation emitted by second radiation source 408', and second radius of curvature $R_2$. So configured, radiation emitted by second radiation source 408' can strike first surface 436 and can be diverted by a third angle α2 relative to second projected path $P'_0$, which can be determined using Equation (3) above. Diverted radiation from second initial beam $B'_0$ can continue through lens 434 to strike second surface 440 and can be diverted thereby by a fourth angle $\beta_2$, which can be determined using Equation (5). A sum of third angle $\alpha_2$ and fourth angle $\beta_2$ can be equal to a second divergence angle γ relative to second projected path $P'_0$.

First photoreceptor 404 can be mounted in probe assembly 400 such that radiation from at least one of first and second radiation sources 408, 408' diverted toward and reflected from the target surface, such as a surface of tip 122 of blade 120, can strike first photoreceptor 404. As indicated above, first photoreceptor 404 can be in optical communication with first photodetector 407 and conduct radiation thereto. In some embodiments, radiation originating from both first and second radiation sources 408, 408' and reflected from the target surface, such as a surface of tip 122 of blade 120, can strike first photoreceptor 404. However, other embodiments can use two or more photoreceptors 404 and respective photodetectors 407 if suitable and/or desired, such as in a configuration similar to that shown in the example of FIG. 11. Thus, a second photoreceptor 404 could be mounted in probe body 402 in optical communication with a second photodetector 407' such that radiation diverted from second radiation source 408' as beam $B'_1$ and reflected from the target surface as beam $B'_2$ strikes the second photoreceptor 404 and is conducted to the second photodetector 407'.

In embodiments of the disclosure, as illustrated in FIG. 12, lens 434 can be used to direct reflected radiation $B_2$, $B'_2$ to one or more photodetectors, such as first photodetector 407 (and optionally second photodetector 407'), via respective photoreceptors 404. As with the example shown in FIG. 11, each photodetector 407 can be in electrical communication with a controller 426 via one or more lines 406, 406' and can send a signal, such as by varying an electrical property of line 406, 406', to controller 426 when it detects one or more of reflected beams $B_2$, $B'_2$. Controller 426 can use the signal(s) to determine an elapsed time Δt between arrivals of tip 122 at each of diverted beams $B_1$, $B'_1$, per the time of arrival measuring technique described above, to determine the tip clearance $D_{blade}$.

Embodiments of the disclosure provide various technical and commercial advantages, examples of which are discussed herein. A technical effect of embodiments is simplified diversion of a beam of radiation from a projected or initial path it would otherwise follow after emission from a radiation source. An assembly using embodiments of the disclosure can divert one or more radiation beams with fewer parts and lower expense than prior art arrangements. In particular, embodiments can be used in probes used to measure distances, such as probes using time of arrival measuring techniques to measure tip clearance of turbine blades in a gas turbine engine.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application of such technology and to enable others of ordinary skill in the art to understand the various embodiments of the present disclosure and the possibility of various modifications of the disclosed embodiments, as may be suited to the particular use(s) contemplated.

What is claimed is:

1. A probe assembly for transmitting radiation from a radiation source to a target surface of a rotating component, the probe assembly comprising:

a probe body mounted in a stationary component;

a first radiation source mounted in the probe body that selectively emits radiation along a first projected path parallel to a longitudinal central axis of the probe body;

a second radiation source mounted in the probe body selectively emits radiation along a second projected path parallel to the longitudinal central axis of the probe body, wherein the first radiation source and the second radiation source are mounted on opposite sides of the longitudinal central axis; and a lens mounted at an end of the probe body facing a location through which the target surface will pass, the lens having a first surface and a second surface spaced apart from the first surface, wherein the second surface is farther from the first radiation source than the first surface, the first surface including a first curved surface with a first center of curvature and a first radius of curvature, the second surface including a second curved surface that has a respective second center of curvature and a respective second radius of curvature, and the second center of curvature is between the first radiation source and the second surface, wherein the first projected path is offset by a first eccentricity from a normal line of the first curved surface that is parallel to the first projected path, whereby radiation emitted by the first radiation source striking the first surface is diverted by a first angle relative to the first projected path, continues through the lens to strike the second surface, and is diverted thereby by a second angle, the radiation having passed through the first curved surface, and whereby a sum of the first angle and the second angle is equal to a first divergence angle; and wherein the second projected path is offset from the normal line by a second eccentricity, and whereby radiation emitted by the second radiation source strikes the first surface and is diverted by a third angle relative to the second projected path, continues through the lens to strike the second surface, and is diverted thereby by a fourth angle relative to the second projected path, and whereby a sum of the third angle and the fourth angle is equal to a second divergence angle.

2. The probe assembly of claim 1, wherein the first surface is spherical and concentric with the longitudinal central axis of the probe body.

3. The probe assembly of claim 1, wherein the first eccentricity is determined based on an index of refraction of a material from which the lens is formed, a frequency of the radiation emitted by the first radiation source, and the first radius of curvature.

4. The probe assembly of claim 1, further comprising a first photoreceptor mounted in the probe body and in optical communication with a first photodetector, whereby radiation diverted from the first radiation source and reflected from the target surface strikes the first photoreceptor, which conducts the reflected radiation to the first photodetector.

5. A probe assembly for transmitting radiation from a radiation source to a target surface of a rotating component, the probe assembly comprising:

a probe body mounted in a stationary component;

a first radiation source mounted in the probe body that selectively emits radiation along a first projected path parallel to a longitudinal central axis of the probe body; and a lens mounted at an end of the probe body facing a location through which the target surface will pass, the lens having a first surface and a second surface spaced apart from the first surface, wherein the second surface is farther from the first radiation source than the first surface, one of the first surface and the second surface including a first curved surface with a first center of curvature and a first radius of curvature;

wherein the first projected path is offset by a first eccentricity from a normal line of the first curved surface that is parallel to the first projected path, whereby radiation striking the first surface is diverted by a first angle relative to the first projected path, continues through the lens to strike the second surface, and is diverted thereby by a second angle, the radiation having passed through the first curved surface, and whereby a sum of the first angle and the second angle is equal to a first divergence angle, wherein the lens includes non-spherical surfaces extending between the first and second surfaces.

6. The probe assembly of claim 1, wherein the lens is a sphere mounted concentrically with the longitudinal central axis of the probe body.

7. The probe assembly of claim 5, further comprising a first photoreceptor mounted in the probe body and in optical communication with a first photodetector such that radiation diverted from the first radiation source and reflected from the target surface strikes the first photoreceptor and is conducted to the first photodetector.

8. The probe assembly of claim 4, wherein radiation diverted from the first radiation source and reflected from the target surface strikes the first photoreceptor and is conducted to the first photodetector, and further comprising a second photoreceptor mounted in the probe body and in optical communication with a second photodetector, whereby radiation diverted from the second radiation source and reflected from the target surface strikes the second photoreceptor and is conducted to the second photodetector.

9. A gas turbine engine, comprising:

a compressor section;

a combustor section;

a turbine section including a plurality of rotating blades, wherein the compressor section is configured to supply compressed air to the combustor section and the combustor section is configured to combust fuel to produce hot gas that is supplied to the turbine section to rotate the plurality of rotating blades; and a probe assembly for transmitting radiation from a radiation source to a target surface of a rotating blade of the plurality of blades, the probe assembly including:

a probe body mounted in a stationary component;

a first radiation source mounted in the probe body that selectively emits radiation along a first projected path parallel to a longitudinal central axis of the probe body;

a second radiation source mounted in the probe body selectively emits radiation along a second projected path parallel to the longitudinal central axis of the probe body, wherein the first radiation source and the second radiation source are mounted on opposite sides of the longitudinal central axis; and a lens mounted at an end of the probe body facing a location through which the target surface will pass, the lens having a first surface and a second surface spaced apart from the first surface, wherein the second surface is farther from the first radiation source than the first surface, the first surface including a first curved surface with a first center of curvature and a first radius of curvature, the second surface includes a second curved surface that has a respective second center of curvature and a respective second radius of curvature, and the second center of curvature is between the first radiation source and the second surface;

wherein the first projected path is offset by a first eccentricity from a normal line of the first curved surface that is parallel to the first projected path, whereby radiation striking the first surface is diverted by a first angle relative to the first projected path, continues through the lens to strike the second surface, and is diverted thereby by a second angle, the radiation having passed through the first curved surface, and whereby a sum of the first angle and the second angle is equal to a first divergence angle; and wherein the second projected path is offset from the normal line by a second eccentricity, and whereby radiation emitted by the second radiation source strikes the first surface and is diverted by a third angle relative to the second projected path, continues through the lens to strike the second surface, and is diverted thereby by a fourth angle relative to the second projected path, and whereby a sum of the third angle and the fourth angle is equal to a second divergence angle.

10. The gas turbine of claim 9, wherein the first surface is spherical and concentric with the longitudinal central axis of the probe body.

11. The gas turbine of claim 9, further comprising a first photoreceptor mounted in the probe body and in optical communication with a first photodetector, whereby radiation diverted from the first radiation source and reflected from the target surface strikes the first photoreceptor, which conducts the reflected radiation to the first photodetector.

12. The gas turbine of claim 9, wherein radiation diverted from the first radiation source and reflected from the target surface strikes the first photoreceptor and is conducted to the first photodetector, and further comprising a second photoreceptor mounted in the probe body and in optical communication with a second photodetector, whereby radiation diverted from the second radiation source and reflected from the target surface strikes the second photoreceptor and is conducted to the second photodetector.

13. The gas turbine of claim 9, wherein at least one of the first eccentricity and the second eccentricity is determined based on an index of refraction of a material from which the lens is formed, a respective frequency of the radiation emitted by the at least one of the first radiation source and the second radiation source, and at least one of the first radius of curvature and the second radius of curvature.

14. A method of determining clearance of a rotating component in a gas turbine engine, the gas turbine engine including a turbine section supplied with hot gas from a combustor section that is supplied with compressed air from a compressor section, the method comprising:

mounting a probe body of a probe assembly in a stationary component of the gas turbine engine;

mounting a first radiation source in the probe body that selectively emits radiation along a first projected path parallel to a longitudinal central axis of the probe body;

mounting a lens at an end of the probe body and facing a location through which a target surface of the rotating component will pass, the lens having a first surface and a second surface spaced apart from the first surface, wherein the second surface is farther from the first radiation source than the first surface, one of the first surface and the second surface including a first curved surface with a first center of curvature and a first radius of curvature;

wherein the first projected path is offset by a first eccentricity from a normal line of the first curved surface that is parallel to the first projected path, whereby radiation striking the first surface is diverted by a first angle relative to the first projected path, continues through the lens to strike the second surface, and is diverted thereby by a second angle, the radiation having passed through the first curved surface, and whereby a sum of the first angle and the second angle is equal to a first divergence angle;

mounting a first photoreceptor in the probe body in optical communication with a first photodetector;

detecting with the first photodetector radiation from the first radiation source that is reflected from the target surface at a first location of the target surface; and determining a clearance of the rotating component using the detection of the reflected radiation from the first radiation source;

mounting a second radiation source in the probe body that selectively emits radiation along a second projected path parallel to the longitudinal central axis of the probe body, wherein the second projected path is offset by a second eccentricity from the normal line of the first curved surface that is parallel to the second projected path, whereby radiation striking the first surface is diverted by a third angle relative to the second projected path, continues through the lens to strike the second surface, and is diverted thereby by a fourth angle, the radiation having passed through the first curved surface, and whereby a sum of the third angle and the fourth angle is equal to a second divergence angle;

mounting a second photoreceptor in the probe body in optical communication with a second photodetector;

detecting with the second photodetector radiation from the second radiation source that is reflected from the target surface at a second location of the target surface; and wherein determining the clearance of the rotating component includes using the detection of the reflected radiation from the second radiation source.

15. The method of claim 14, wherein determining the clearance includes using a time of arrival technique.

* * * * *